United States Patent
Cobene et al.

(10) Patent No.: US 6,572,318 B2
(45) Date of Patent: Jun. 3, 2003

(54) MANAGING BOOKBINDING CONSUMABLES

(75) Inventors: Robert L. Cobene, Santa Clara, CA (US); John P. Ertel, Portola Valley, CA (US); Akinobu Kuramoto, Pleasanton, CA (US)

(73) Assignee: Hewlett-Packard Development Co., LP, Houston, TX (US)

( * ) Notice: Subject to any disclaimer, the term of this patent is extended or adjusted under 35 U.S.C. 154(b) by 0 days.

(21) Appl. No.: 09/846,108

(22) Filed: Apr. 30, 2001

(65) Prior Publication Data

US 2002/0158398 A1 Oct. 31, 2002

(51) Int. Cl.⁷ .................................. G06F 17/60
(52) U.S. Cl. ...................... 412/11; 412/14; 700/240; 399/8; 399/24; 705/28; 705/29
(58) Field of Search ................. 700/244, 240; 399/8, 24; 705/28, 29; 412/11, 14

(56) References Cited

U.S. PATENT DOCUMENTS

| | | | |
|---|---|---|---|
| 5,140,380 A | * | 8/1992 | Nakamura et al. .......... 355/324 |
| 5,305,199 A | | 4/1994 | LoBiondo et al. |
| 5,594,529 A | | 1/1997 | Yamashita et al. |
| 5,608,643 A | * | 3/1997 | Wichter et al. ........ 364/479.14 |
| 5,735,659 A | * | 4/1998 | Kosasa et al. .................. 412/9 |
| 5,774,688 A | * | 6/1998 | Georgitsis et al. .......... 395/500 |
| 5,808,894 A | * | 9/1998 | Wiens et al. ........... 364/479.01 |
| 6,023,593 A | | 2/2000 | Tomidokoro |
| 6,173,128 B1 | | 1/2001 | Saber et al. |
| 6,188,991 B1 | * | 2/2001 | Rosenweig et al. ........... 705/29 |
| 6,206,358 B1 | * | 3/2001 | Yamaguchi et al. ...... 270/52.02 |
| 6,354,582 B1 | * | 3/2002 | Hafer et al. ............. 270/58.07 |
| 6,405,178 B1 | * | 6/2002 | Manchala et al. ............ 705/29 |
| 6,421,582 B1 | * | 7/2002 | Wada ......................... 700/232 |

* cited by examiner

Primary Examiner—Douglas Hess

(57) ABSTRACT

Systems and methods of managing consumables used in a bookbinding system are described. In one aspect, a bookbinding consumables quantity interrogator is configured to obtain information relating to usage of one or more consumables in a bookbinding system, and a processor is configured to compute usage statistics for the one or more bookbinding consumables based upon usage information obtained by the bookbinding consumables quantity interrogator.

20 Claims, 5 Drawing Sheets

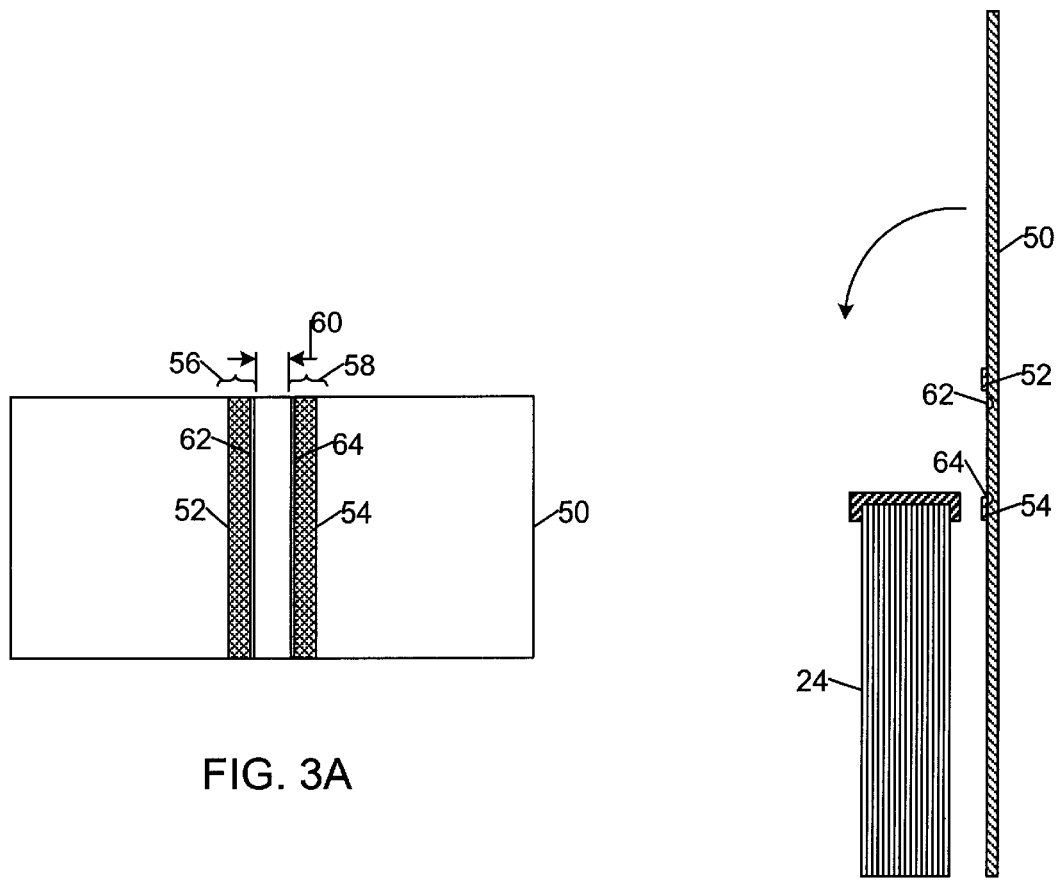
FIG. 3A
FIG. 3B
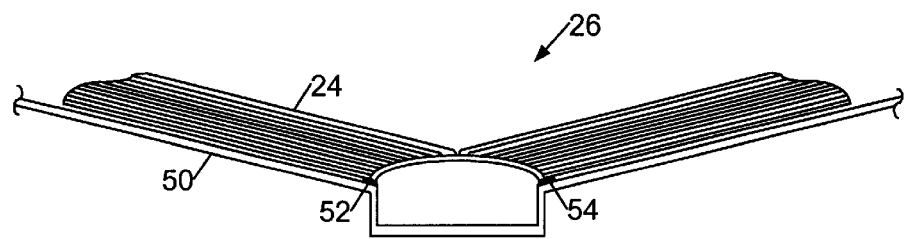
FIG. 3C

MANAGING BOOKBINDING CONSUMABLES

CROSS-REFERENCE TO RELATED APPLICATIONS

This application is related to U.S. application Ser. No. 09/837,648, filed on Apr. 18, 2001, by Akinobu Kuramoto et al., and entitled "Determining When Adhesive in a Replaceable Adhesive Dispenser is Nearly Spent," which is incorporated herein by reference. This application also is related to U.S. patent application Ser. No. 09/721,549, filed Nov. 24, 2000, by Robert L. Cobene et al., and entitled "SYSTEMS AND METHODS OF ATTACHING A COVER TO A TEXT BODY," and to U.S. patent application Ser. No. 09/776,251, filed Feb. 3, 2001, by Robert L. Cobene et al., and entitled "SYSTEMS AND METHODS OF BINDING A TEXT BODY," both of which are incorporated herein by reference.

TECHNICAL FIELD

This invention relates to systems and methods for managing bookbinding consumables.

BACKGROUND

Today, a variety of different bookbinding systems can deliver professionally bound documents, including books, manuals, publications, annual reports, newsletters, business plans, and brochures. A bookbinding system generally may be classified as a commercial (or trade) bookbinding system that is designed for in-line manufacturing of high quality volume runs or an in-house (or office) bookbinding system designed for short "on-demand" runs. Commercial bookbinding systems generally provide a wide variety of binding capabilities, but require large production runs (e.g., on the order of thousands of bindings) to offset the set-up cost of each production run and to support the necessary investment in expensive in-line production equipment. Office bookbinding systems, on the other hand, generally involve manual intervention and provide relatively few binding capabilities, but are significantly less expensive to set up and operate than commercial bookbinding systems, even for short on-demand production runs of only a few books.

In general, a bookbinding system collects a plurality of sheets (or pages) into a text body (or book block) that includes a spine and two side hinge areas. The bookbinding system applies an adhesive to the text body spine to bind the sheets together. A cover may be attached to the bound text body by applying an adhesive to the side hinge areas or the spine of the text body, or both. The cover of a typical commercial soft cover book generally is attached to the text body spine. The covers of hardcover books and some soft cover "lay flat" books, on the other hand, typically are attached to the side hinge areas of the text body and are not attached to the text body spines (i.e., the spines are "floating").

SUMMARY

The invention features systems and methods of managing consumables used in a bookbinding system.

In one aspect of the invention, a bookbinding consumables quantity interrogator is configured to obtain information relating to usage of one or more consumables in a bookbinding system, and a processor is configured to compute usage statistics for the one or more bookbinding consumables based upon usage information obtained by the bookbinding consumables quantity interrogator.

Embodiments of the invention may include one or more of the following features.

The processor preferably is configured to compute estimates of inventory levels for one or more consumables based upon usage information obtained by the bookbinding consumables quantity interrogator. The processor may be configured to place an order with a remote consumables supplier based upon the computed inventory level estimates.

The processor may be configured to compute an average book size for books produced over a period of time or an average production rate for books produced over a period of time, or both. In some embodiments, the processor is configured to compute adjustments for one or more operating parameters of the bookbinding system based upon usage information obtained by the bookbinding consumables quantity interrogator. The processor also may be configured to compute adjustments for one or more consumable product configuration parameters based upon the obtained usage information.

The processor may be disposed at a location remote from the bookbinding system and may be coupled to the bookbinding consumables quantity interrogator by a communication link. The processor may be configured to transmit the computed usage statistics to a display.

A memory device may be configured to store usage information obtained by the bookbinding consumables quantity interrogator. The memory device may be mounted to a consumable plug-in cartridge housing. In one embodiment, the bookbinding consumables quantity interrogator is configured to obtain an indication of a length of solid sheet adhesive remaining within a plug-in cartridge housing of an adhesive dispenser disposed within a receptacle of the bookbinding system.

Other features and advantages of the invention will become apparent from the following description, including the drawings and the claims.

DESCRIPTION OF DRAWINGS

FIG. 3A is a diagrammatic front view of a cover with two strips of pressure sensitive adhesive applied to areas corresponding to the side hinge areas of a bound text body.

FIG. 3B is a diagrammatic end view of the cover of FIG. 3A being folded over a bound text body.

FIG. 3C is a diagrammatic end view of an open bound book with a floating spine formed by attaching the cover of FIG. 3A to the bound text body of FIG. 3B.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
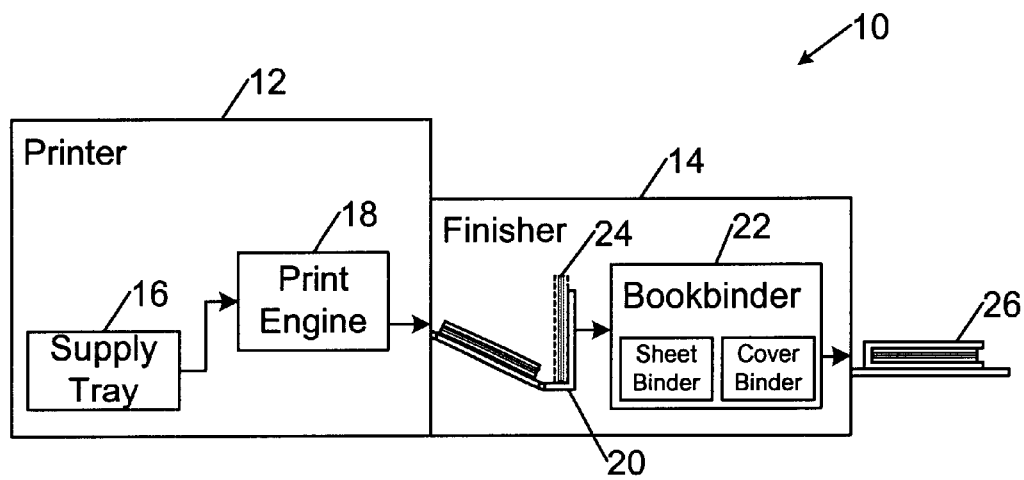
FIG. 1 is a block diagram of a bookbinding system.

Referring to FIG. 1, in one embodiment, a bookbinding system 10 includes a printer 12 and a finisher 14. Bookbinding system 10 may be implemented as a desktop or office bookmaking system designed to satisfy on-demand bookbinding needs. Printer 12 may be a conventional printer (e.g., a LaserJet® printer available from Hewlett-Packard Company of Palo Alto, Calif., U.S.A.) that includes a supply tray 16 that is configured to hold a plurality of sheets (e.g., paper sheets), and a print engine 18 that is configured to apply markings onto the sheets received from supply tray 16. Finisher 14 includes a sheet collector 20 and a bookbinder 22. Bookbinder 22 includes a sheet binder that is configured to bind the text body sheets to one another, and a cover binder that is configured to attach a cover to the bound text body. In operation, sheets are fed from supply tray 16 to print engine 18, which prints text, pictures, graphics, images and other patterns onto the sheets. The printed sheets are fed to sheet collector 20, which collects and aligns the sheets into a text body 24 with an exposed spine bounded by two exposed side hinge areas. The text body 24 is conveyed to bookbinder 22. The sheet binder binds the sheets of text body 24, and the cover binder attaches a cover to the bound text body to produce a bound book 26 with a floating spine or an attached spine.

Figure 2:
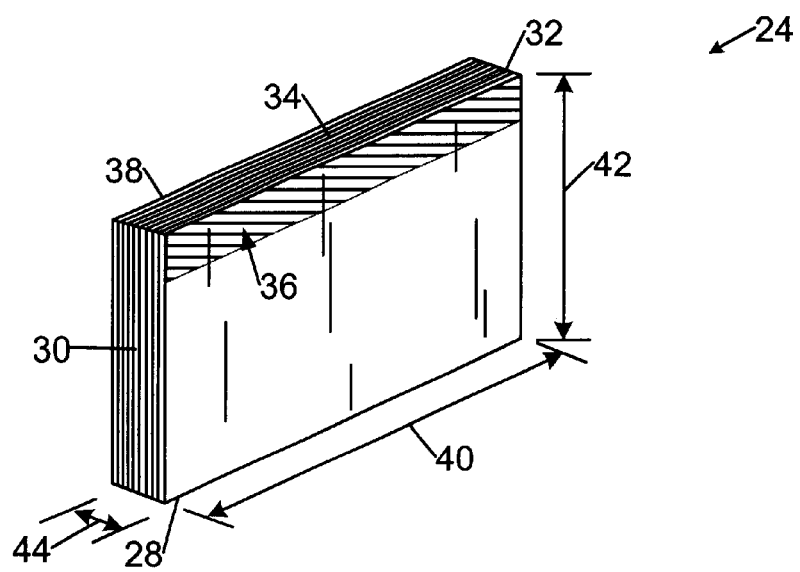
FIG. 2 is a diagrammatic perspective view of a text body formed by collecting and aligning a plurality of sheets.

Referring to FIG. 2, text body 24 includes a plurality of sheets and is characterized by a front end 28, two sides 30, 32 and a spinal area (or spine) 34, which is located opposite to front end 28. Spine 34 is bounded by two side hinge areas 36, 38. Text body 24 may be characterized by a height dimension 40, a width dimension 42, and a thickness dimension 44. The spinal area exposed for adhesive penetration may be increased before adhesive is applied by registering and aligning the text body sheets with respect to two datum edges. In particular, the sheets preferably are aligned with reference to front end 28 of text body 24 and one of the two text body sides 30, 32 so that variations in sheet dimensions are accommodated in the text body width dimension 42 of spinal area 34. As a result, the spinal surface area exposed for adhesive penetration is greater than if all of the sheets were registered and aligned with respect to spine edge 34. Upon cooling, the hot melt adhesive re-solidifies and binds the sheets into a bound text body. A variety of different adhesive compositions may be used to bind the text body sheets, including a conventional paper-backed hot melt sheet adhesive that may be dispensed from a roll and may be obtained from Minnesota Mining and Manufacturing Company (3M), of St. Paul, Minn., United States.

Referring to FIGS. 3A–3C, in one embodiment, a solid pressure sensitive adhesive film is applied to a cover 50 as two strips 52, 54 in cover areas 56, 58 that correspond to side hinge areas 36, 38 of text body 24. In this embodiment, pressure sensitive adhesive strips 52, 54 are spaced apart by a width dimension 60 that is at least as wide as the thickness dimension 44 of text body spine 34. As shown in FIG. 3B, cover 50 is aligned with respect to the same datum edges used to align the sheets of text body 24, cut to size, and folded over the bound text body 24. Cover 50 preferably is scored along a pair of score lines 62, 64 to allow cover 50 preferentially to fold over spinal area 34 of text body 24. Pressure is applied to cover areas 56, 58 to activate pressure sensitive adhesive strips 52, 54 and, thereby, attach cover 50 to text body 24. As shown in FIG. 3C, the resulting perfectly bound book 26 has a floating spine that enables the book 26 to lay flat when opened.

As used herein, "pressure sensitive adhesives" refer to a class of adhesive compositions that are applied with pressure and generally do not undergo a liquid to solid transition in order to hold materials together. Pressure sensitive adhesives may be solvent-free natural or synthetic resins characterized by the rapid wetting of a surface to form an adhesive bond upon contact with the surface under pressure.

As explained in detail below, in some embodiments, the respective cartridge housings for the solid hot melt sheet adhesive and the pressure sensitive adhesive tape are configured to plug into respective receptacles in bookbinder 22 of finisher 14. In these embodiments, bookbinder 22 may be configured to obtain automatically an indication of the length of solid sheet adhesives remaining within each of the plug-in cartridge housings. Bookbinder 22 also may be configured to replace automatically an exhausted adhesive dispenser with a new adhesive dispenser of an adhesive stack that has been loaded into bookbinder 22 based upon a signal received from a sensor. After each of the loaded adhesive dispensers has been exhausted, bookbinder 22 may display a notice indicating that another adhesive dispenser stack should be loaded into the system.

Figure 4:
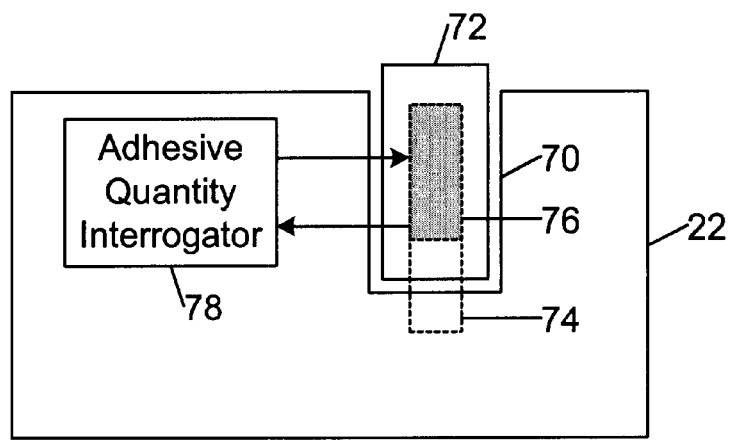
FIG. 4 is a block diagram of a bookbinder that includes a receptacle for receiving a plug-in cartridge housing of an adhesive dispenser and an adhesive quantity interrogator.

Referring to FIG. 4, in one embodiment, bookbinder 22 may include a receptacle 70 that is configured to receive a plug-in cartridge housing 72 of an adhesive dispenser (e.g., a hot melt adhesive dispenser or a pressure sensitive adhesive dispenser), which contains a length of solid sheet adhesive 74 wound into a roll 76. Bookbinder 22 also includes an adhesive quantity interrogator 78 that is configured to obtain an indication of the length of solid sheet adhesive 74 remaining within the plug-in cartridge housing 72. Based upon this length indication, bookbinder 22 may determine whether a sufficient amount of adhesive 74 is available to complete a current binding job, or whether the adhesive dispenser should be replaced.

Figure 5:
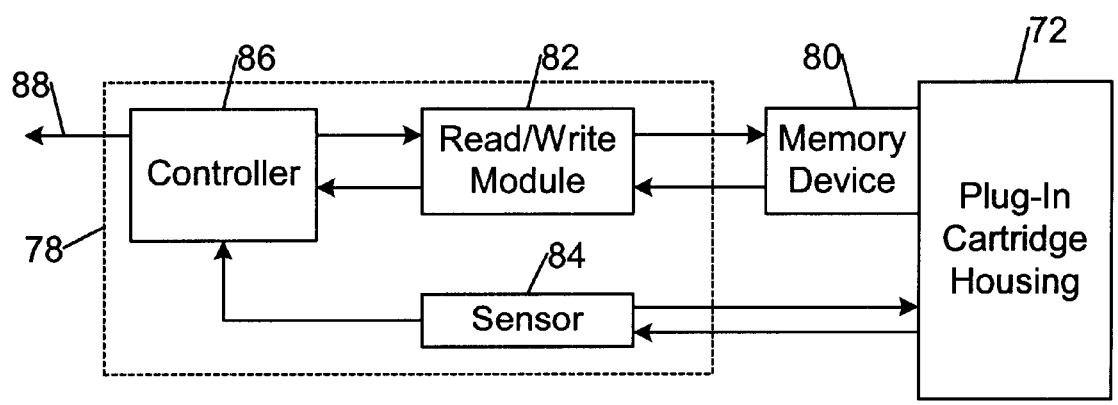
FIG. 5 is a block diagram of an adhesive quantity interrogator that is configured to interrogate a memory device, which is attached to a plug-in cartridge housing of an adhesive dispenser.

Referring to FIG. 5, in one embodiment, a memory device 80 (e.g., a 256-bit 1-WIRE™ EEPROM available from Dallas Semiconductor of Dallas, Tex. U.S.A.) is mounted on plug-in cartridge housing 72 and adhesive quantity interrogator 78 includes a read/write module 82 that is configured to read information from and write information to memory device 80. Adhesive quantity interrogator 78 also includes a sensor 84 that is configured to obtain an indication of the length of solid sheet adhesive 74 dispensed from cartridge housing 72, and a controller 86 that is configured to control the operation of read/write module 82 and to communicate with bookbinder 22. In operation, memory device 80 initially may be programmed to store the length of adhesive contained in an unused adhesive cartridge. During use, controller 84 may update the length value stored in memory device 80 based upon an indication of the length of adhesive used obtained by sensor 84. As a result, the length of adhesive 74 remaining within cartridge housing 72 may be stored in memory device 80 and updated each time adhesive is dispensed. When the length value stored in memory device 80 is smaller than the length of adhesive needed to complete a particular binding job, controller 86 sends to an adhesive loading system of bookbinder 22 a signal 88 indicating that the adhesive dispenser should be replaced. In this way, adhesive quantity interrogator ensures that a current binding job may be completed properly. In addition, because an indication of the length of adhesive remaining is stored with adhesive cartridge 72, partially used adhesive cartridges may be inserted into bookbinder 22 and adhesive quantity interrogator 78 readily may determine the length of adhesive available for binding. This approach avoids the need to store adhesive availability information in a memory device of bookbinder 22. In addition to adhesive length information, memory device 80 also may be programmed to store other information, including an identifier corresponding to the type of adhesive contained within cartridge 72, an indication of the age of the adhesive, and quality control tracking information, such as an identifier corresponding to the location where the adhesive cartridge was manufactured and the manufacturing lot number.

Sensor 84 may obtain an indication of the length of solid sheet adhesive 74 dispensed from cartridge housing 72 directly, for example, by reading a rotary encoder that is coupled to the adhesive dispensing drive mechanism, or indirectly, for example, by obtaining a measurement of separation between clamps holding text body 24 while the text body sheets are being bound together by hot melt adhesive.

Additional systems and methods of obtaining an indication of the length of solid sheet adhesive dispensed from cartridge housing 72 may be obtained from U.S. application Ser. No. 09/837,648, filed Apr. 18, 2001, by Akinobu Kuramoto et al., and entitled "Determining When Adhesive in a Replaceable Adhesive Dispenser is Nearly Spent."

As mentioned above, in addition to monitoring the quantity of a consumable remaining within a replaceable consumable dispenser, a bookbinding consumables manager may be provided to compute certain usage statistics for one or more of the consumables in the bookbinding system.

Figure 6:
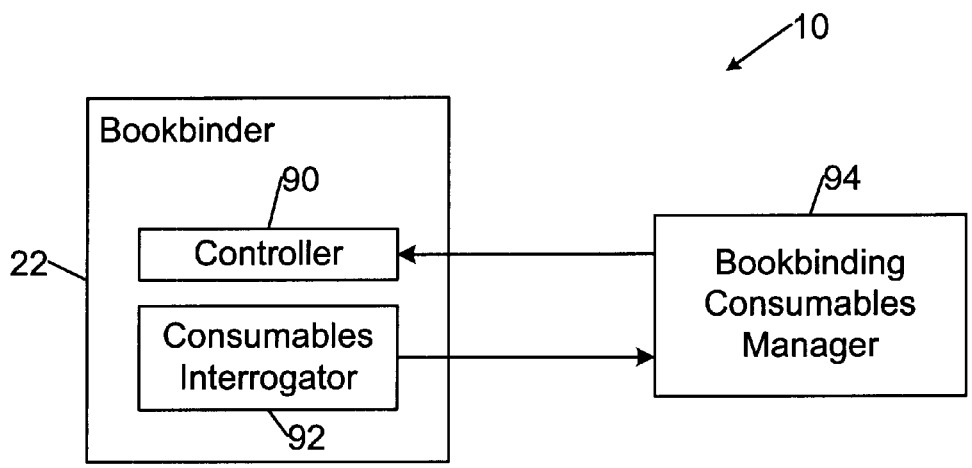
FIG. 6 is a block diagram of a bookbinder and a bookbinding consumables manager that is configured to manage one or more consumables used by the bookbinder.

Referring to FIG. 6, in one embodiment, bookbinding system 10 includes a bookbinding controller 90 and a bookbinding consumables quantity interrogator 92. Bookbinding controller 90 is configured to control the operation of one or more functional aspects of bookbinder 22. Bookbinding consumables quantity interrogator 92 is configured to obtain information relating to the usage of one or more consumables in bookbinder 22. Such usage information may include, for example, the amount of adhesive remaining in a plug-in cartridge housing of a hot melt or pressure sensitive adhesive dispenser, the amount of cover stock remaining within bookbinder 22, and the sizes (e.g., number of pages, height and width dimensions) of books produced over time. A bookbinding consumables manager 94 is coupled to retrieve the usage information from bookbinding consumables quantity interrogator 92 and is configured to compute usage statistics for one or more of the consumables used in bookbinder 22. As explained below, bookbinding consumables manager 94 also may be configured to transmit control signals to bookbinding controller 90 for adjusting one or more operating parameters for bookbinder 22 based upon the usage information obtained from bookbinding consumables quantity interrogator 92. In addition, in some embodiments, bookbinding consumables manager 94 may be configured to compute adjustments for one or more consumable product configuration parameters for a bookbinding consumables supplier based upon the usage information obtained from bookbinding consumables quantity interrogator 92.

In one mode of operation the usage statistics computed by bookbinding consumables manager 94 may be used to provide just-in-time (JIT) inventory control to enable inventory carrying costs and downtime caused by exhaustion of consumables stocks to be reduced. In addition, by avoiding unexpected downtime due to the exhaustion of consumables stocks, replacement costs also may be reduced (e.g., expedited delivery charges for exhausted consumables may be avoided).

In general, in this mode of operation, bookbinding consumables manager 94 is configured to determine when the consumables should be re-ordered to cover usage needs based upon to an estimate of the mean usage ($\mu_U$) of a consumable and an estimated mean lead (or replenishment) time ($\mu_L$) for the consumable. In some embodiments, bookbinding consumables manager 94 also is configured to implement an inventory control strategy that accommodates uncertainty in usage or lead time, or both. For a variety of reasons (e.g., changes in product life cycles, seasonal variations in demand, and changing economic conditions), future consumables usage patterns are uncertain, and the times at which re-ordered consumables and other components will be received from suppliers are uncertain. To handle such uncertainty, many different statistical models have been proposed to determine the appropriate inventory levels (i.e., safety stock) to hold to meet target service level requirements. Conventionally, safety stock levels may be estimated based upon the average lead time, the variance in the lead time, the average usage rate, and the variance in the usage rate (see, e.g., EDWARD A. SILVER & REIN PETERSON, DECISION SYSTEMS FOR INVENTORY MANAGEMENT AND PRODUCTION PLANNING (1985)).

The mean consumable usage ($\mu_U$) may be computed based upon a determination of the amount of consumable used over a selected period. This determination may be made directly based upon the amount of consumable dispensed or indirectly based upon the number and size of books produced by bookbinding system 10. The estimated mean lead time ($\mu_L$) and estimated lead time standard deviation ($\sigma_L$) may be set by a bookbinding consumables asset manager. In some embodiments, these parameters may be set dynamically to reflect current information about supplier or market conditions.

In general, bookbinding consumables customers and bookbinding consumables suppliers may communicate order requests and order confirmations over a global communication network. In addition, customers may manage supplies of consumables from a remote access node through a communication link established over the global communication network. The global communication network may include a number of different computing platforms and transport facilities, including a voice network, a wireless network and a computer network (e.g., the Internet). The order requests and order confirmations transmitted between the customer site and the consumables supplier may be presented in a number of different media formats, such as voice, Internet, e-mail and wireless formats. In addition, the transmissions between the customer site, the consumables supplier and the remote access node may be conducted in accordance with one or more conventional secure transmission protocols. For example, each transmission may involve packaging a communication, including any associated metadata, into an encrypted transfer file that may be transmitted securely from one entity to another.

Figure 7A:
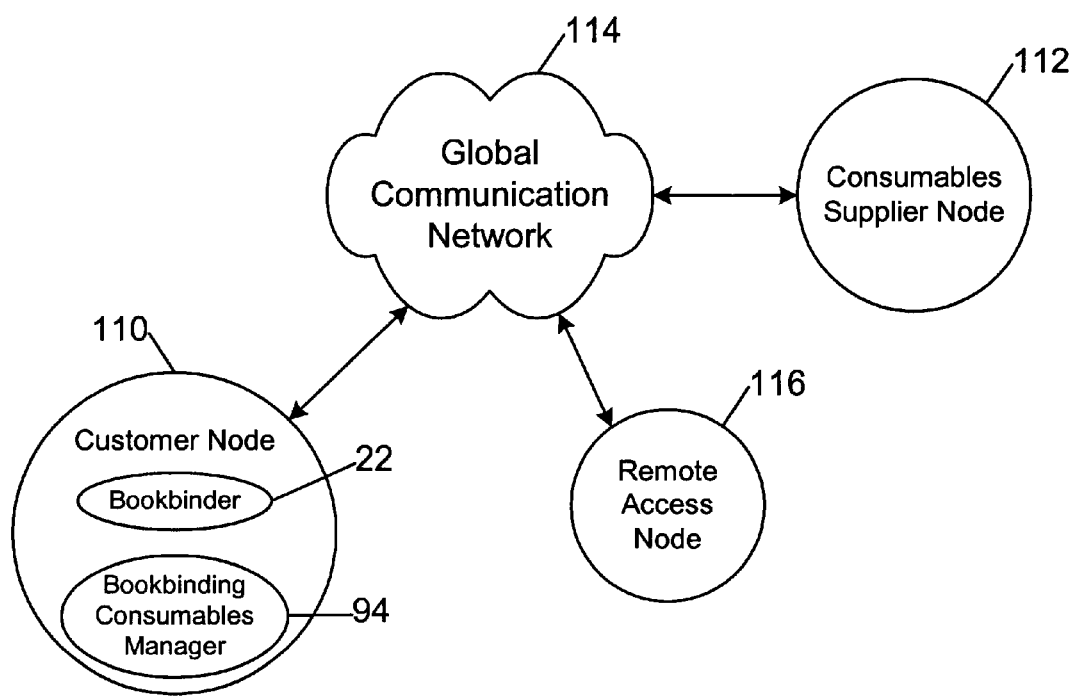
FIG. 7A is a diagrammatic representation of a customer node that includes a bookbinding system and a bookbinding consumables manager; the customer node is coupled to a consumables supplier node and a remote access node by a global communication network.

As shown in FIG. 7A, in one embodiment, bookbinder 22 and bookbinding consumables manger 94 may be located at a customer node 110, which is coupled to a consumables supplier node 112 by a global communication network 114. In this embodiment, bookbinding consumables manager 94 may be configured to automatically re-order a supply of the consumable from the consumables supplier to maintain the estimated inventory levels for the one or more consumables. Alternatively, bookbinding consumables manager 94 may be configured to transmit a message to a display prompting an asset manager to place an order with the consumables supplier.

Figure 7B:
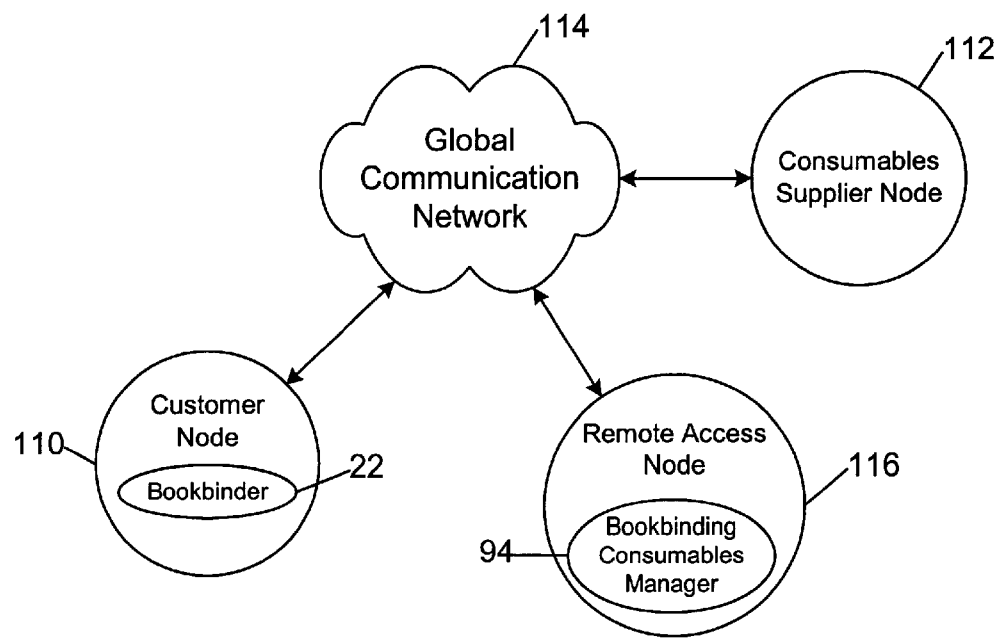
FIG. 7B is a diagrammatic representation of the network of FIG. 7A in which the bookbinding consumables manager is located at the remote access node rather than the customer node.

As shown in FIG. 7B, in another embodiment, bookbinding consumables manager 94 may reside at a remote access node 116. In this embodiment, a customer may manage one or more bookbinding consumables used in bookbinder 22 from a remote location. In particular, bookbinding consumables manager 94 may interrogate bookbinder 22 from the remote access node 116 to determine the status of one or more consumables being monitored by bookbinding consumables quantity interrogator 92. Based on this information, bookbinding consumables manager 94 may compute usage statistics for the one or more bookbinding consumables to determine when one or more consumables should be re-ordered to maintain the estimated inventory levels for the one or more consumables. In this embodiment, bookbinding consumables manager 94 may be configured to automatically re-order a supply of the consumable from the consumables supplier. Alternatively, bookbinding consumables manager 94 may be configured to transmit a message to a display at customer node 110 prompting an asset manager to place an order with the consumables supplier.

Figure 7C:
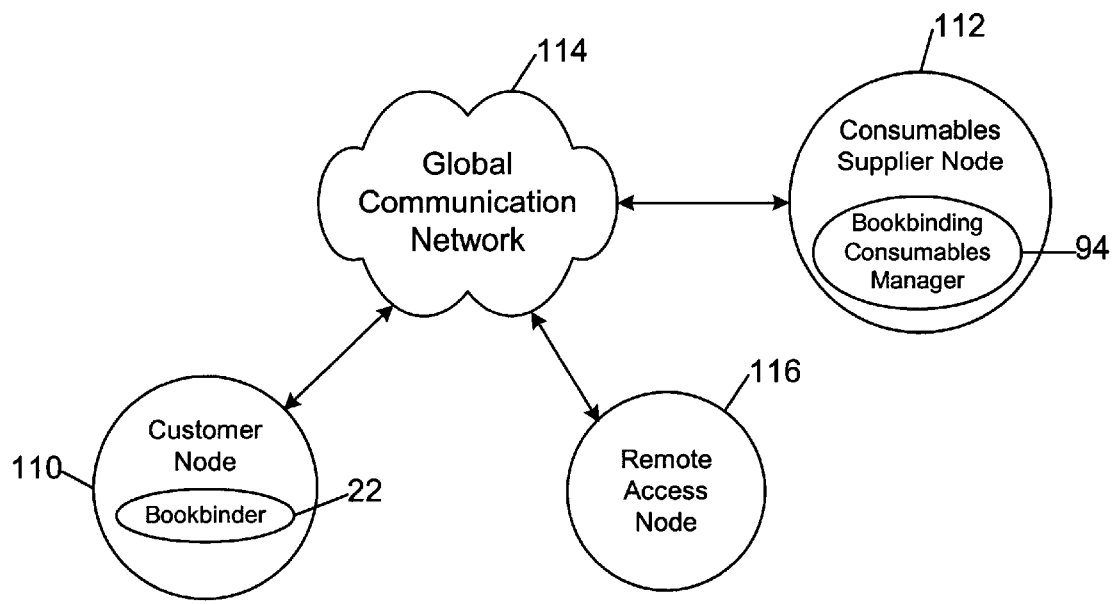
FIG. 7C is a diagrammatic representation of the network of FIG. 7A in which the bookbinding consumables manager is located at the consumables supplier node rather than the customer node.

Referring to FIG. 7C, in another embodiment, bookbinding consumables manager 94 may reside at consumables supplier node 112. In this embodiment, the consumables supplier may manage one or more bookbinding consumables used in bookbinder 22 from consumables supplier node 112. In particular, bookbinding consumables manager 94 may interrogate bookbinder 22 to determine the status of one or more consumables being monitored by bookbinding consumables quantity interrogator 92. Based on this information, bookbinding consumables manager 94 may compute usage statistics for the one or more bookbinding consumables to determine when one or more consumables should be re-ordered to maintain the estimated inventory levels for the one or more consumables. In this embodiment, bookbinding consumables manager 94 may be configured to automatically re-order a supply of the consumable. Alternatively, bookbinding consumables manager 94 may be configured to transmit to a display located at customer node 110 a message prompting an asset manager to place an order with the consumables supplier.

In any of the above-described embodiments, bookbinding consumables manager 94 also may be configured to compute adjustments to one or more consumable product configuration parameters based upon the usage information obtained from consumables interrogator 92. For example, based upon the usage statistics computed for a number of different customers, the consumables supplier may determine that the unit size of one or more consumable products should be changed, or that more than one unit size of a particular consumable product should be produced and offered to customers for purchase. Other product configuration adjustments may be made in accordance with any of a wide variety of different marketing models.

In another mode of operation, bookbinding consumables manager 94 may be configured to compute adjustments to one or more operating parameters for bookbinder 22 based upon the usage information obtained by bookbinding consumables quantity interrogator 92. For example, certain operating parameters (e.g., the length of the cooling period after the hot melt adhesive has been applied to the spine area of text body 24) may be adjusted based upon a computed average book size produced by bookbinder 22 (i.e., the length of the cooling period may be adjusted to track the computed average book size). In this way, operating parameters may be tailored for each customer so that the operating efficiency of bookbinding system 10 may be optimized. By this approach, the production times for producers of small books may be reduced automatically based upon their usage patterns. In this mode of operation, the operating parameter adjustments may be transmitted from bookbinding consumables manager 94 over a local node connection or over a global communication network connection, or both.

The systems and methods described herein are not limited to any particular hardware or software configuration, but rather they may be implemented in any computing or processing environment, including in digital electronic circuitry or in computer hardware, firmware or software. The bookbinding consumables manager and bookbinding controller modules may be implemented, in part, in a computer program product tangibly embodied in a machine-readable storage device for execution by a computer processor. In some embodiments, the bookbinding consumables manager and bookbinding controller modules preferably are implemented in a high level procedural or object oriented programming language; however, the algorithms may be implemented in assembly or machine language, if desired. In any case, the programming language may be a compiled or interpreted language. The bookbinding consumables manager and bookbinding controller methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

For example, in addition, to managing bookbinding consumables, the systems and methods described above may be used to manage the replacement of component parts of bookbinding system 10.

Still other embodiments are within the scope of the claims.

What is claimed is:

1. A system for managing bookbinding consumables, comprising:
   a bookbinding consumables quantity interrogator configured to obtain information relating to usage of one or more consumables in a bookbinding system, including a bookbinding adhesive; and
   a processor coupled to the bookbinding consumables quantity interrogator and configured to compute usage statistics for the one or more consumables in the bookbinding system, including an indication of an amount of the bookbinding adhesive, based upon usage information obtained by the bookbinding consumables quantity interrogator.

2. The system of claim 1, wherein the processor is configured to compute estimates of inventory levels for one or more consumables based upon usage information obtained by the bookbinding consumables quantity interrogator.

3. The system of claim 2, wherein the processor is configured to place an order with a remote consumables supplier based upon the computed inventory level estimates.

4. The system of claim 1, wherein the processor is disposed at a location remote from the bookbinding system and is coupled to the bookbinding consumables quantity interrogator by a communication link.

5. The system of claim 1, wherein the processor is configured to transmit the computed usage statistics to a display.

6. The system of claim 1, further comprising a memory device configured to store usage information obtained by the bookbinding consumables quantity interrogator.

7. The system of claim 6, wherein the memory device is mounted to a consumable plug-in cartridge housing.

8. A system for managing bookbinding consumables, comprising:
   a bookbinding consumables quantity interrogator configured to obtain information relating to usage of one or more consumables in a bookbinding system; and
   a processor coupled to the bookbinding consumables quantity interrogator and configured to compute usage statistics for the one or more consumables in the bookbinding system based upon usage information obtained by the bookbinding consumables quantity interrogator, wherein the processor is configured to compute an average book size for books produced over a period of time.

9. A system for managing bookbinding consumables, comprising:
   a bookbinding consumables quantity interrogator configured to obtain information relating to usage of one or more consumables in a bookbinding system; and
   a processor coupled to the bookbinding consumables quantity interrogator and configured to compute usage statistics for the one or more consumables in the bookbinding system based upon usage information obtained by the bookbinding consumables quantity interrogator, wherein the processor is configured to compute an average production rate for books produced over a period of time.

10. A system for managing bookbinding consumables, comprising:
   a bookbinding consumables quantity interrogator configured to obtain information relating to usage of one or more consumables in a bookbinding system; and
   a processor coupled to the bookbinding consumables quantity interrogator and configured to compute usage statistics for the one or more consumables in the bookbinding system based upon usage information obtained by the bookbinding consumables quantity interrogator, wherein the processor is configured to compute adjustments for one or more operating parameters of the bookbinding system based upon usage information obtained by the bookbinding consumables quantity interrogator.

11. A system for managing bookbinding consumables, comprising:
   a bookbinding consumables quantity interrogator configured to obtain information relating to usage of one or more consumables in a bookbinding system; and
   a processor coupled to the bookbinding consumables quantity interrogator and configured to compute usage statistics for the one or more consumables in the bookbinding system based upon usage information obtained by the bookbinding consumables quantity interrogator, wherein the bookbinding consumables quantity interrogator is configured to obtain an indication of a length of solid sheet adhesive remaining within a plug-in cartridge housing of an adhesive dispenser disposed within a receptacle of the bookbinding system.

12. An automated method performed by a bookbinding system to manage bookbinding consumables, comprising:
   obtaining information relating to usage of one or more consumables in a bookbinding system, including a bookbinding adhesive; and
   computing usage statistics for the one or more consumables in the bookbinding system, including an indication of an amount of the bookbinding adhesive, based upon the usage information obtained.

13. The method of claim 12, wherein the computed usage statistics include estimates of inventory levels for one or more consumables red based upon the obtained usage information.

14. The method of claim 13, further comprising placing an order with a remote consumables supplier based upon the computed inventory level estimates.

15. The method of claim 12, further comprising accessing the computed usage statistics from a location remote from the bookdinding system.

16. A method for managing bookbinding consumables, comprising:
   obtaining information relating to usage of one or more consumables in a bookbinding system; and
   computing usage statistics for the one or more consumables in the bookbinding system based upon the usage information obtained, wherein the computed usage statistics include an average production rate for books produced over a period of time.

17. An automated method performed by a bookbinding system to manage bookbinding consumables, comprising:
   obtaining information relating to usage of one or more consumables in a bookbinding system;
   computing usage statistics for the one or more consumables in the bookbinding system based upon the usage information obtained; and
   computing adjustments for one or more operating parameters of the bookbinding system based upon the obtained usage information.

18. A method for managing bookbinding consumables, comprising:
   obtaining information relating to usage of one or more consumables in a bookbinding system; and
   computing usage statistics for the one or more consumables in the bookbinding system based upon the usage information obtained, wherein the computed usage statistics include an average book size for books produced over a period of time.

19. An automated method performed by a bookbinding system to manage bookbinding consumables, comprising:
   obtaining information relating to usage of one or more consumables in a bookbinding system;

computing usage statistics for the one or more consumables in the bookbinding system based upon the usage information obtained; and computing adjustments for one or more consumable product configuration parameters based upon the obtained usage information.

20. A method for managing bookbinding consumables, comprising:

obtaining information relating to usage of one or more consumables in a bookbinding system, wherein the obtained usage information includes an indication of a length of solid sheet adhesive remaining within a plug-in cartridge housing of an adhesive dispenser disposed within a receptacle of the bookbinding system; and computing usage statistics for the one or more consumables in the bookbinding system based upon the usage information obtained.

* * * * *